United States Patent [19]

Saito et al.

[11] Patent Number: 4,828,364
[45] Date of Patent: May 9, 1989

[54] LIQUID CRYSTAL DISPLAY DEVICE WITH LIGHT SHIELD OF SPECIFIC TRANSMITTANCE

[75] Inventors: Yuichi Saito, Hachioji; Fumio Kadoo, Yokosuka, both of Japan

[73] Assignee: Asahi Glass Company Ltd., Tokyo, Japan

[21] Appl. No.: 130,655

[22] Filed: Dec. 9, 1987

[30] Foreign Application Priority Data

Dec. 19, 1986 [JP] Japan ................................ 61-301559

[51] Int. Cl.$^4$ ................................................ G02F 1/13
[52] U.S. Cl. .................................. 350/339 F; 350/336
[58] Field of Search ............................ 350/336, 339 F

[56] References Cited

U.S. PATENT DOCUMENTS 4,506,956  3/1985  Dir ................................ 350/339 F
4,591,240  5/1986  Masaki et al. ................ 350/339 F
4,601,546  7/1986  Ohta ............................. 350/339 F

FOREIGN PATENT DOCUMENTS 162227  8/1985  Japan .
249179  12/1985  Japan .

Primary Examiner—Stanley D. Miller
Assistant Examiner—Anita E. Pellman
Attorney, Agent, or Firm—Oblon, Fisher, Spivak, McClelland & Maier

[57] ABSTRACT

A liquid crystal display device of negative display type, which comprises a liquid crystal cell comprising a nematic liquid crystal layer sandwiched between substrates provided with electrodes and a light shielding layer covering other than the area corresponding to a display pattern and adapted to apply a voltage sufficient to energize the nematic liquid crystal to the electrodes at a display pattern area other than a desired display pattern, and a pair of polarizing films provided on both sides of the liquid crystal cell with their polarization axes arranged to permit light from a no voltage-applied portion to pass therethrough, wherein the light shielding layer has a light transmittance of not higher than 1.0% and higher than the minimum light transmittance of the display pattern area during the application of the voltage.

14 Claims, 2 Drawing Sheets

LIQUID CRYSTAL DISPLAY DEVICE WITH LIGHT SHIELD OF SPECIFIC TRANSMITTANCE

BACKGROUND OF THE INVENTION

1. Field of the Invention

The present invention relates to a liquid crystal display device of negative display type having a light shielding layer formed therein.

2. Discussion of Background

Heretofore, a negative display wherein letters or patterns are displayed brightly on a dark display surface has been used in many cases for liquid crystal display devices used for the display portions of watches or meters for automobiles.

In a negative liquid crystal display device, no voltage is applied to the liquid crystal layer at the background area and liquid crystal molecules are twisted at the background area, whereby light propagates along the twisted liquid crystal molecules, and a pair of polarizing films are disposed with their polarization axes being in parallel with each other so that no light is transmitted at the background area. At the background area of a usual negative liquid crystal display device, light propagates in a twisted fashion as mentioned above, but there has been a problem such that light having a certain color is transmitted to some extent, since the transmittance of the conventional negative liquid crystal display device depends on wavelength of the light. The ratio in contrast (contrast ratio) between a case where a pair of polarizing films are simply disposed with their polarization axes being perpendicular to each other and a case wherein they are disposed with their axes being in parallel with each other, will be as high as at least 1,000. However, when a liquid crystal layer is sandwiched therebetween in a usual negative liquid crystal display device, light propagates in a twisted fashion at the background area, as mentioned above, whereby no adequate polarization is obtainable with respect to all the colors and leakage of light is observed at the background area, which used to be a problem.

It has been proposed to form a light shielding layer at the background area thereby to prevent the leakage of light at the background area.

However, when such a light shielding layer is provided simply to prevent the leakage of light at the background area, the background area can be made dark, but leakage of light is still observed at a non-display (dark) pattern portion within the display pattern area, where no light transmission is desired and the same problem as mentioned above with respect to the background area will result at this portion. If the ratio in the darkness between the background area and this non-display pattern portion becomes substantial, the display may likely be misread as light is transmitted at the portion where no light should properly be transmitted.

It has been previously proposed to provide a light shielding layer at the background area and at the same time dispose polarizing films in the same manner as in the case of a positive liquid crystal display device so that light is transmitted at a portion where no voltage is applied to liquid crystal, whereby the operation of the display pattern is conducted by applying a voltage to the liquid crystal at a portion where no light is to be transmitted. Thus, at a portion where a voltage is applied to the liquid crystal, the liquid crystal molecules are vertically aligned, whereby there will be no influence by a color, and by disposing a pair of polarizing films so that their polarization axes are perpendicular to each other, it is possible to obtain a high level of light shielding effect by adequately utilizing the polarizing performance of the polarizing films, and it is possible to obtain a high contrast of at least 1,000.

Thus, with a liquid crystal display device having a light shielding layer formed therein and having polarizing films with their polarization axes arranged in the same manner as in a positive display device, it is possible to obtain a high contrast as mentioned above, when observed from the front. However, when observed from an oblique direction, there will be a phenomenon in which leakage of light is observed to some extent at a non-display (dark) pattern portion where a voltage is applied to the liquid crystal, due to the viewing angle dependency of the liquid crystal. Consequently, the difference in the light transmittance will be distinct between the portion where the light transmittance is almost completely shielded by the light shielding layer and the non-display pattern portion where a voltage is applied to the liquid crystal, whereby misreading is likely to be led.

Therefore, such a liquid crystal device is useful for an application where a viewing angle is restricted to a front direction or to a certain specific direction, but it has a problem that the viewing angle is narrow for an application where a wide range of viewing angle is required.

SUMMARY OF THE INVENTION

It is an object of the present invention to solve the above-mentioned problem.

The present invention provides a liquid crystal display device of negative display type, which comprises a liquid crystal cell comprising a nematic liquid crystal layer sandwiched between substrates provided with electrodes and a light shielding layer covering other than the area corresponding to a display pattern and adapted to apply a voltage sufficient to energize the nematic liquid crystal to the electrodes at a display pattern area other than a desired display pattern, and a pair of polarizing films provided on both sides of the liquid crystal cell with their polarization axes arranged to permit light from a no voltage-applied portion to pass therethrough, wherein the light shielding layer has a light transmittance of not higher than 1.0% and higher than the minimum light transmittance of the display pattern area during the application of the voltage.

According to the present invention, a wide range of viewing angle will be ensured without leading to misreading while maintaining a relatively high contrast ratio by adjusting the light transmittance of the light shielding layer to a level of not higher than 1.0%, particularly from 0.1 to 1.0%, and higher than the minimum light transmittance of the display pattern area during the application of the voltage and by operating the display pattern area in the same manner as in the case of a positive display type.

DETAILED DESCRIPTION OF THE PREFERRED EMBODIMENTS

The present invention will be described in detail with reference to the drawings.

Figure 1:
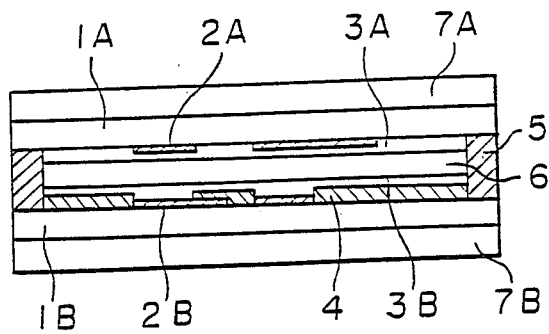
FIG. 1 is a cross-sectional view of a typical embodiment of the present invention.

FIG. 1 is a cross-sectional view illustrating a typical embodiment of a twisted nematic liquid crystal display device of negative display type of the present invention.

In FIG. 1, reference numeral 1A designates a substrate, numeral 2A designates an electrode formed thereon, and an orientation layer 3A is further formed thereon. Whereas on the other substrate 1B, an electrode 2B and a light shielding layer 4 having a light transmittance of not higher than 1.0% to cover an area other than the display pattern area are formed, and an orientation layer 3B is formed thereon. Such a pair of substrates are disposed so that the electrode surfaces face to each other and sealed along their periphery with a sealing material 5, and a nematic liquid crystal is injected into the interior to form a liquid crystal layer 6, whereby a liquid crystal cell is formed.

On both sides of this liquid crystal cell, a pair of polarizing films 7A and 7B are provided so that their polarization axes are arranged to shut off light at a portion where a voltage is applied, as in the case of a usual liquid crystal display element of positive display type.

Specifically, the orientation layers are formed with a twist of about 90° so that the liquid crystal molecules are in a state twisted at an angle of about 90° under such a condition that no voltage is applied, and the polarizing films are disposed so that the polarization axes are in parallel with or perpendicular to the respective orientation directions. Namely, the polarization axes of the polarizing films are arranged with an angle of about 90° to each other.

Even when the orientation directions are at an angle of 90°, the twist of the liquid crystal molecules may be at an angle of not 90° but 270° or 450° Likewise, the orientation angles may not necessarily be accurately at an angle of 90° but may be at an angle of 85° or 100°. Further, the angle between the polarization axes and the orientation directions may not necessarily be restricted to the parallel or perpendicular relation but may depart therefrom to some extent, for example, 5° or 85°.

However, the pair of polarizing films are preferably arranged so that their polarization axes are perpendicular to each other, whereby a high contrast ratio is obtainable by reducing the light transmittance during the application of the voltage. This is possible since the disposition of the polarizing films takes the same disposition as in the case of a positive display type despite the present invention is of negative display type. The liquid crystal molecules are vertically aligned at the portion where the voltage is applied, and light is shut out by the pair of polarizing films disposed at both sides thereof with their polarization axes being perpendicular to each other to make that portion adequately dark.

The substrates used in the present invention may be any substrates so long as they are transparent substrates made of e.g. glass or plastic. On their inner surfaces, a transparent electrode is formed by a transparent conductive layer of e.g. $In_2O_3-SnO_2$(ITO), $SnO_2$ or $In_2O_3$. The transparent electrode may be connected with a conductive layer made of e.g. a metal or conductive paste to make a connection with driving circuits.

The orientation layers may be any orientation layers so long as they are capable of orienting the liquid crystal. They may be formed by rubbing a layer made of an organic polymer such as polyimide, polyamide or polyvinyl alcohol or an inorganic material such as $SiO_2$, $TiO_2$ or $Al_2O_3$, or by oblique vapor deposition. Such orientation layers may be of a single layer structure or a double layer structure, as the case requires.

The light shielding layer of the present invention may be formed on the inner surface of the liquid crystal cell or on the outer surface thereof, and its light transmittance is adjusted to be not higher than 1.0%, particularly from 0.1 to 1.0%. The light transmittance of this light shielding layer is adjusted to be higher than the minimum light transmittance of the display pattern area during the application of the voltage, preferably from 2 to 20 times higher than the minimum light transmittance. It is preferred to form the light shielding layer on the inner surface of the liquid crystal cell, since positional displacement between the display pattern and the light shielding layer, that is the parallax problem, is then less likely when observed from an oblique direction.

The present invention takes such a construction, because the light transmittance varies at the display pattern area depending upon the direction from which the area is viewed since the liquid crystal molecules are aligned in a certain direction at that area, while the light transmittance of the light shielding layers is substantially equal as viewed from any direction other than from the front direction. If it is simply required to have a high contrast ratio as observed in a certain specific direction, the light transmittance of the light shielding layer may simply be equal to the minimum light transmittance of the display pattern area during the application of the voltage. In such a case, the contrast ratio can easily be made as high as at least 2,000. However, when the liquid crystal display device is to be viewed within a relatively wide range of viewing angle, the light transmittance of the display pattern area during the application of the voltage increases depending upon the direction from which it is viewed. Consequently, the portion which should properly be observed dark may slightly be brightened, thus leading to possible misreading. In the present invention, the light transmittance of the light shielding layer is adjusted to be higher than the minimum light transmittance of the display pattern area during the application of the voltage, as mentioned above, whereby such misreading is minimized.

The light shielding layer is formed at the background area of the display and may usually be formed on one of the substrates. It may be divided and formed on both substrates. However, it is advantageous to form it on only one of the substrates, since the process steps may thereby be reduced in number and the productivity may thereby be increased.

Such a light shielding layer may be formed, for example, by printing a light shielding ink such as a carbon paste or by vapor depositing or plating a metal light shielding layer such as aluminum, nickel or chromium on the transparent electrode and insulating layer.

In the front direction where the transmittance is usually at the minimum level, such a light shielding layer at the background area usually permits a larger quantity of light to pass than the light transmitted through the liquid crystal at the voltage-applied portion i.e. at the non-display pattern portion. However, the display portion is far brighter such a background area, whereby there is no likelihood of misreading. When observed from an oblique direction as opposed to the front direction, the light transmittance at the background area where the light shielding layer is present, is equal to the light transmittance in the front direction, but the light transmitted through the liquid crystal at the non-display pattern portion increases substantially over the front direction. However, in the present invention, the light transmittance of the light shielding layer is adjusted to be higher than the minimum light transmittance of the display pattern area during the application of the voltage, and there is no substantial difference between the light transmitted through the liquid crystal at the non-display pattern portion and the light transmitted through the light shielding layer at the background area, whereby there will be no substantial likelihood of misreading.

Figure 2:
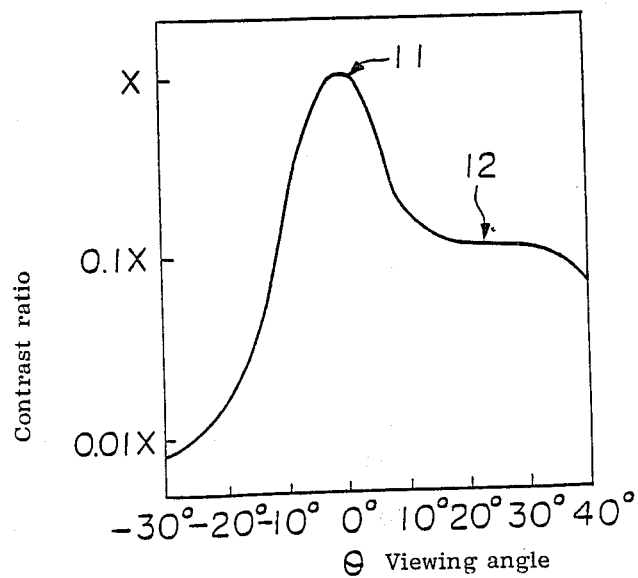
FIG. 2 is a graph showing the relation between the viewing angle and the contrast ratio.

FIG. 2 is a graph showing the contrast ratio depending upon the viewing angle of a positive display liquid crystal display element. The portion 11 showing the maximum contrast ratio is at an angle of about 0°, and a slightly curved portion 12 showing a contrast ratio of about 10% of the maximum contrast ratio X (minimum light transmittance) is located at a portion slightly displaced from there towards the main viewing angle direction. Therefore, a wide viewing angle can be obtained by adjusting the light transmittance of the light shielding layer so that the contrast ratio of the slightly curved portion substantially agrees with the light transmittance of the light shielding layer within a range of from 0.1 to 1.0%.

Otherwise, depending upon the desired viewing angle and the contrast ratio, the light transmittance of the light shielding layer may be adjusted to a level of not higher than 1.0% and higher than the minimum light transmittance of the display pattern area (non-display pattern portion) during the application of the voltage. In this case, the light transmittance of the light shielding layer may usually be adjusted within a range of from 0.1 to 1.0%.

Specifically, the light transmittance of the light shielding layer is preferably adjusted to be from 2 to 20 times higher than the minimum light transmittance of the non-display pattern portion during the application of the voltage within the above-mentioned range.

When polarizing films having a high polarization efficiency are used, the minimum light transmittance of the non-display pattern portion during the application of the voltage can be extremely lowered. In such a case, the light transmittance may be lowered to a level of 1/5,000, whereby misreading is unlikely even if the light transmittance of the light shielding layer is adjusted to be less than 0.1%.

Even in such a case, it is of course necessary to maintain the light transmittance of the light shielding layer at a level higher than the minimum light transmittance of the non-display pattern portion during the application of the voltage. Particularly when the light transmittance is higher by from 2 to 20 times, misreading is unlikely within a wide range of the viewing angle.

According to the present invention, the light shielding degree of the light shielding layer may be relatively low, and therefore, the thickness of the light shielding layer may be made thin which otherwise is likely to cause short circuiting as in the case of a carbon ink, or it is possible to use an ink having a low light shielding degree such as an ink prepared by mixing non-conductive three color pigments such as cyan, mazenta and yellow. Thus, there will be an advantage such that no short circuiting is likely to result between the upper and lower substrates. Short circuiting is unlikely also when black titanium oxide particles having high insulating properties are employed.

The thickness of the light shielding layer may vary depending upon the material and the manner of the formation of the layer. In the method of printing a light shielding ink, the thickness may be within a range of from about 0.2 to about 3 μm.

In the present invention, the light shielding layer is preferably formed on the inner surface of the substrate, as mentioned above. The formation on the inner surface may take two different structures.

In the first structure, the light shielding layer is formed between the electrode and the substrate. Namely, the light shielding layer is formed on the substrate and then an electrode is formed thereon, if necessary, with an insulating layer interposed therebetween.

In the second structure, the light shielding layer is formed on the electrode. In this case, an electrode is formed on the substrate, and then the light shielding layer is formed thereon, if necessary, with an insulating layer interposed therebetween.

The latter structure is preferred. Namely, the light shielding layer is substantially thicker than the electrode, and a substantial difference will be created by the presence of the shielding layer.

Therefore, when the light shielding layer is formed beneath the electrode as in the former structure, it is necessary to eliminate the step of the light shielding layer in order to prevent the breakage of the electrode. Thus, it is necessary to form a transparent layer having the same thickness as the light shielding layer at the inner portion of the light shielding layer, whereby the productivity will be poor.

Whereas in the latter structure, the light shielding layer is formed on the electrode, and there will be no breakage of the electrode even if the light shielding layer is so thick. Besides, the area where the light shielding layer is formed is the background area which is always displayed relatively dark. Therefore, there is no substantial problem even when Δn.d (Δn: anisotropy of refractive index, d: thickness of the liquid crystal layer) at such an area is different from other area because the thickness of the liquid crystal layer is thin at such an area.

Further, the light shielding layer is preferably formed on a common electrode. This is because it is necessary that the liquid crystal is adequately vertically aligned during the application of the voltage in order for this liquid crystal display device to have a high contrast ratio. For this reason, it is usually adapted for static driving. In such a case, the common electrode can be an electrode covering the entire surface of one of the substrates. Thus, even if the light shielding layer having electrical conductivity is formed on the common electrode, there will be no short circuiting problem between the adjacent electrodes on the same substrate.

Then, the above-mentioned orientation layer may be formed on this light shielding layer.

The sealing material may be a usual sealing material such as an epoxy resin or a silicone resin. It is usual to provide a filling hole in the sealing material. After assembling a cell, the liquid crystal will be injected from the filling hole, and then the hole is sealed.

The liquid crystal to be injected may be a usual nematic liquid crystal, which usually has a twist at an angle of about 90°. However, a chiral substance may be incorporated to adjust the twist to an angle of 270° or 450° as mentioned above.

Further, a color filter layer may be formed on the inner surface or on the outer surface of the substrate. The substrate may be made of a polarizing film substrate. A transparent touch switch, an ultraviolet cutting filter or a non-glare filter may be laminated on the outer surface of the substrate. A usual technique commonly employed for the liquid crystal display element may be applied so long as it does not adversely affect the effect of the present invention.

The liquid crystal display device of the present invention may have an element for widening the viewing angle, such as a microlens, provided at its front to further widen the viewing angle. Further, this liquid crystal display device may be applied to a projection-type display apparatus so that a display is projected on e.g. a screen. Otherwise, it may be modified so that the display of the liquid crystal display device may be observed as reflected on a mirror such as a flat surface mirror or a curved surface mirror.

The liquid crystal display device of the present invention allows the transmission of a light in a state where no voltage is applied, and thus is useful for indicating a power off condition such as an interruption of service, a power trouble or a plug being off the socket outlet. Specifically, such a liquid crystal display device may be prepared by forming a light shielding layer on a pair of substrates having an electrode provided on their entire surface except for a predetermined pattern. For example, if a liquid crystal display device is prepared by forming such a light shielding layer except for a pattern of "OFF", the letter "OFF" will be displayed when the power is off, and the display will disappear when the power is on where liquid crystals are vertically aligned to shut off the transmission of light.

In the present invention, the device as a whole is of a negative display type, but the application of the voltage to the electrodes is conducted in the same manner as in the case of a positive display type.

Namely, no voltage is applied to a portion where light of the liquid crystal is to be transmitted, and a voltage is applied to a portion where light is to be shielded. Thus, the light transmittance of the liquid crystal at the portion where the voltage is applied can be made at a level of not higher than 0.1% as viewed from the front direction. Further, even when it is viewed from an oblique direction, the difference in the light transmittance between the light-shielding portion (a non-display pattern portion) of the liquid crystal and the background area is not substantial, whereby misreading is unlikely.

According to the present invention, light leaks at a level of from about 0.1 to 1.0% which is the light transmittance of the light shielding layer, at the background area where the light shielding layer exists.

Whereas, at the display pattern area where no light shielding layer is provided, light is shielded at the non-display pattern portion where the voltage is applied. At such a non-display pattern portion, the light transmittance in the front direction will be not higher than about 0.1%, and not higher than a few percent even in an oblique angle although it varies depending upon the viewing angle.

At the display pattern portion where no voltage is applied, light will be transmitted.

Thus, the posibility of misreading is substantially minimized as viewed from an oblique direction although the contrast ratio in the front direction is slightly lowered.

Now, the present invention will be described in further detail with reference to Examples. However, it should be understood that the present invention is by no means restricted to such specific Examples.

EXAMPLE 1

A liquid crystal display device was assembled to have a structure as shown in FIG. 1, wherein ZLI-2978-000 manufactured by Merck Company was used as the liquid crystal, G-1220Du manufactured by Nitto Denko K.K. was used as the polarizing films and the cell space was 5.7 $\mu$m.

The light shielding layer was formed on an electrode (common electrode) on the inner surface of the cell by printing a carbon ink to have a thickness of about 2 $\mu$m and a light transmittance of about 0.5%. An overcoating layer of polyimide was formed on this light shielding layer and rubbed to form an orientation layer. On the other substrate, an overcoating layer of polyimide was formed directly on the electrode and rubbed to form an orientation layer.

An illuminating means was disposed behind this liquid crystal display element to obtain a transmission type liquid crystal display device. The driving method was a static driving, and the driving voltage was 10 V.

Figure 3:
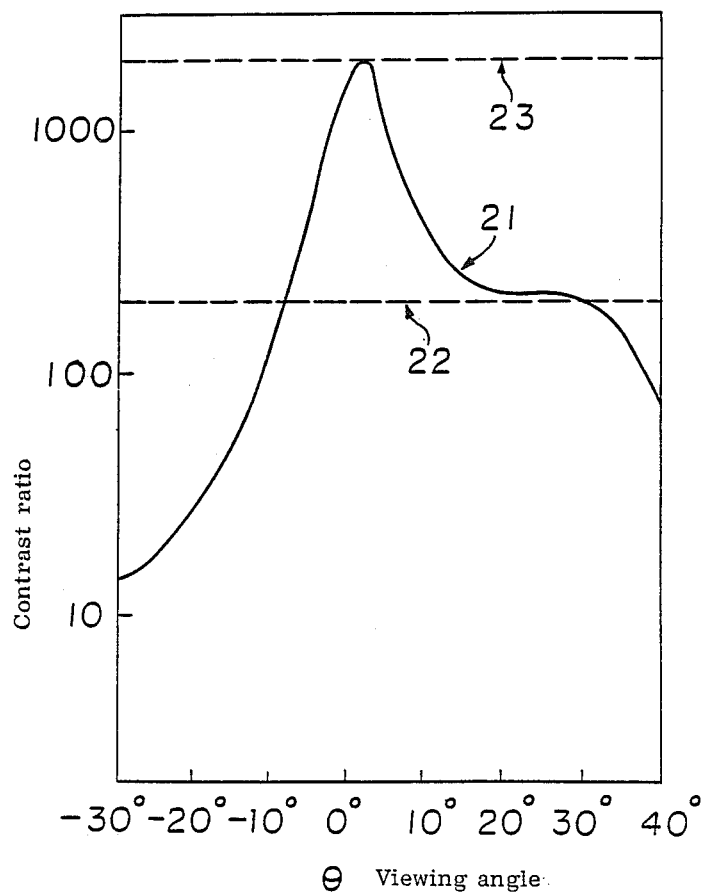
FIG. 3 is a graph showing the relation between the viewing angle and the contrast ratio in Example 1.

FIG. 3 is a graph showing the contrast ratio of this liquid crystal display element in the main viewing angle direction ($\theta > 0°$) and the opposite viewing angle direction ($\theta < 0°$) by a solid line 21.

For reference, the contrast ratio 200 of the light transmittance of the light shielding layer to the liquid crystal light transmission portion is indicated by a dotted line 22, and the maximum contrast ratio 2,000 at the display pattern portion is indicated by a dotted line 23.

In this Example, the light transmittance of the light shielding layer was adjusted so that the contrast ratio at the portion where the contrast ratio in the direction of viewing angle slightly changes, agreed substantially with the contrast ratio by the light transmittance at the light shielding layer portion.

Thus, the light transmittance of the background area and the light transmittance of the non-display pattern portion were substantially the same within a range of viewing angle of from $-10°$ to $40°$. Within this range, there was no substantial difference in the light transmittance, and possible misreading was unlikely.

The light shielding layer of the liquid crystal display element of this Example may have a light transmittance of from 0.1 to 1.0% and may therefore be relatively thin. Thus, no short circuiting occured between the substrates although the space between the substrates was 5.7 $\mu$m.

Whereas, a liquid crystal display element wherein the light transmittance of the light shielding layer was adjusted to the maximum contrast ratio of 2,000 at the display pattern area had a high contrast and extremely high legibility when viewed from the front, but when viewed from an oblique direction, leakage of light at the non-display pattern portion of the display pattern area was distinct and the legibility was poor. Further, with this liquid crystal display element, the light shielding layer was obliged to be thick in order to increase the light shielding degree of the light shielding layer, whereby short circuiting was likely to occur between the upper and lower substrates.

EXAMPLE 2

A liquid crystal display element was prepared in the same manner as in Example 1 except that the light transmittance was adjusted to 1% by changing the carbon ink of Example 1 to an ink prepared by mixing non-conductive three-color pigments of cyan, mazenda and yellow.

With this liquid crystal display element, the contrast was lowered as viewed from the front, but possible misreading was unlikely within a relatively wide range of viewing angle, as in the case of Example 1.

In this Example, since the light shielding degree may be relatively low, such a non-conductive ink can be employed without short circuiting between the substrates.

EXAMPLE 3

A liquid crystal display device was prepared in the same manner as in Example 1 except that on the other substrate on which no light shielding layer was formed in Example 1, an insulating layer of silica-titania was formed on the electrode, and then an overcoating layer of polyimide was formed and rubbed to form an orientation layer.

This liquid crystal display device was superior to the liquid crystal display device of Example 1 in that short circuiting between the substrates was more unlikely to occur.

EXAMPLE 4

A liquid crystal display device was prepared in the same manner as in Example 1 except that on the other substrate on which no light shielding layer was formed in Example 1, a green color filter was formed by printing on the display pattern area of the electrode, and an overcoating layer of polyimide was formed thereon and rubbed to form an orientation layer.

This liquid crystal display device presented a beautiful green-colored display.

EXAMPLE 5

A liquid crystal display device was prepared in the same manner as in Example 1 except that a red dichroic dye was incorporated in the liquid crystal.

This liquid crystal display device presented a beautiful red-colored display.

In the present invention, the light transmittance of the light shielding layer is adjusted to a level of not higher than 1.0%, particularly from 0.1 to 1.0% and the operation of the display pattern portion is conducted in the same manner as a positive display type, whereby a wide range of viewing angle can be obtained without leading to misreading while maintaining the contrast at a relatively high level.

In the present invention, the light transmittance of the light shielding layer is set at a high level of from about 0.1 to 1.0%, whereby the thickness of the light shielding layer can be thin, and even when a conductive pigment such as a carbon ink is used, short circuiting between the substrates due to coagulated carbon particles hardly occurs and it is possible to employ a light shielding layer made of an ink prepared by mixing non-conductive three-color pigments of cyan, mazenda and yellow. Thus, the reliability and productivity can be improved.

Particularly when the light transmittance of the light shielding layer is set so that the light transmittance of the slightly curved portion in the contrast ratio curve where the contrast ratio is about 10% of the maximum contrast ratio at the portion slightly displaced towards the main viewing angle direction, agrees substantially with the light transmittance of the light shielding layer, it is possible to obtain a wide range of viewing angle within which misreading is unlikely.

Various structures commonly employed in conventional liquid crystal display elements may be applied to the present invention so long as such structures do not adversely affect the effects of the present invention. Various applications of the present invention may be possible.

What is claimed is:

1. A liquid crystal display device of negative display type, which comprises a liquid crystal cell comprising:
   a nematic liquid crystal layer sandwiched between substrates provided with electrodes;
   a light shielding layer covering other than the area corresponding to a display pattern;
   an orientation layer placed on said light shielding layer;
   means for applying a voltage sufficient to energize the nematic liquid crystal to the electrodes at a display pattern area other than a desired display pattern;
   and a pair of polarizing films provided on both sides of the liquid crystal cell with their polarization axes arranged to permit light from a no voltage-applied portion to pass therethrough, wherein the light shielding layer has a light transmittance of not higher than 1.0% and higher than the minimum light transmittance of the display pattern area during the application of the voltage.

2. The liquid crystal display device according to claim 1, wherein the light transmittance of the light shielding layer is from 2 to 20 times higher than the minimum light transmittance of the display pattern area during the application of the voltage.

3. The liquid crystal display device according to claim 1, wherein the light transmittance of the light shielding layer is form 0.1 to 1.0%.

4. The liquid crystal display device according to claim 2, wherein the nematic liquid crystal is twisted at an angle of about 90° and the pair of the polarizing films are disposed so that their polarization axes are substantially perpendicular to each other.

5. The liquid crystal display device according to claim 2, wherein the light shielding layer is formed on the inner surface of a substrate.

6. The liquid crystal display device according to claim 5, wherein the light shielding layer is formed on an electrode.

7. The liquid crystal display device according to claim 6, wherein the light shielding layer is formed on a common electrode.

8. The liquid crystal display device according to claim 5, wherein the light shielding layer is a layer formed by printing a light shielding ink.

9. The liquid crystal display device according to claim 8, wherein the light shielding layer is formed on a common electrode.

10. The liquid crystal display device according to claim 2, wherein the light transmittance of the light shielding layer is adjusted to substantially the same level as the contrast ratio at which substantially constant contrast is obtainable within a wide range of viewing angle of the liquid crystal display device.

11. The liquid crystal display device according to claim 1, wherein an illuminating means is provided behind the rear side polarizing film.

12. The liquid crystal display device according to claim 1, wherein a liquid crystal containing a dichroic dye is used as the nematic liquid crystal.

13. A liquid crystal display device, which comprises a liquid crystal cell comprising:
   a nematic liquid crystal layer sandwich between substrates provided with electrodes;
   a light shielding layer formed on an inner surface of at least one of the substrates to cover other than the area corresponding to a display pattern;
   an orientation layer placed on said light shielding layer;
   means for applying a voltage sufficient to energize the nematic liquid crystal to the electrodes at a display pattern area other than a desired display pattern; and
   a pair of polarizing films provided on both sides of the liquid crystal cell with therein polarization axes being substantially perpendicular to each other, wherein the light shielding layer has a light transmittance of not higher than 1.0% and from 2 to times higher than the minimum light transmittance of voltage, and an illuminating means is provided behind the rear side polarizing film.

14. The liquid crystal display device according to claim 13, wherein a color filter layer :s provided on the inner surface of at least one of the substrates at the area corresponding to the display pattern.

* * * * *